United States Patent
Hewitt et al.

(10) Patent No.: US 9,471,878 B2
(45) Date of Patent: Oct. 18, 2016

(54) DYNAMIC MATHEMATICAL VALIDATION USING DATA MINING

(71) Applicant: International Business Machines Corporation, Armonk, NY (US)

(72) Inventors: Trudy L. Hewitt, Cary, NC (US); Francesco C. Schembari, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 14/328,986

(22) Filed: Jul. 11, 2014

(65) Prior Publication Data

US 2016/0012345 A1    Jan. 14, 2016

(51) Int. Cl.
| | | |
|---|---|---|
| G06N 5/00 | (2006.01) | |
| G06F 1/00 | (2006.01) | |
| G06N 7/00 | (2006.01) | |
| G06F 17/30 | (2006.01) | |
| G06N 99/00 | (2010.01) | |

(52) U.S. Cl.
CPC ........... *G06N 7/00* (2013.01); *G06F 17/30572* (2013.01); *G06N 99/005* (2013.01)

(58) Field of Classification Search
CPC ........... G06N 5/02; G06N 5/04; G06N 5/048
See application file for complete search history.

(56) References Cited

U.S. PATENT DOCUMENTS

| | | |
|---|---|---|
| 5,469,538 A | 11/1995 | Razdow |
| 8,498,892 B1 | 7/2013 | Cohen et al. |
| 2006/0041505 A1* | 2/2006 | Enyart ................. G06Q 20/102 705/40 |
| 2013/0006990 A1 | 1/2013 | Bonanni et al. |
| 2014/0330633 A1* | 11/2014 | Moran ............... G06Q 30/0244 705/14.43 |

FOREIGN PATENT DOCUMENTS

| | | |
|---|---|---|
| JP | 2003256770 | 9/2003 |
| WO | 2011060682 A1 | 5/2011 |

OTHER PUBLICATIONS

US Patent Application, dated Mar. 10, 2015, for U.S. Appl. No. 14/643,526, filed Mar. 10, 2015, invented by Trudy L. Hewitt et al., Total 29 pages.
Preliminary Amendment, dated Mar. 10, 2015, for U.S. Appl. No. 14/643,526, filed Mar. 10, 2015, invented by Trudy L Hewitt et al., Total 5 pages.
List of IBM Patents or Patent Applications Treated as Related, Total 2 pp., Mar. 10, 2015.
Mell et al., "Effectively and Securely Usingthe Cloud Computing Paradigm", dated Oct. 7, 2009, NIST, Information Technology Laboratory, Total 80 pages.

(Continued)

*Primary Examiner* — Stanley K Hill
*Assistant Examiner* — Kalpana Bharadwaj
(74) *Attorney, Agent, or Firm* — Janaki K. Davda; Konrad, Raynes, Davda and Victor LLP

(57) ABSTRACT

Provided are techniques for dynamic mathematical validation using data mining. As text is being received, a mathematical statement is identified in the text based on context of the text. A mathematical solution to the mathematical statement is identified in the text based on the context of the text. It is determined that the mathematical solution is incorrect using data mining. In response to determining that auto-correction is to be performed, the mathematical solution is corrected.

14 Claims, 6 Drawing Sheets

(56) References Cited

OTHER PUBLICATIONS

Mell et al., "The NIST Definition of Cloud Computing (Draft)", dated Jan. 2011, Recommendations of the National Institute of Standards and Technology (NIST), Computer Security Division Information Technology Laboratory National Institute of Standards and Technology, Total 7 pages.

"Mathematical Equations", (online), retrieved from the Internet on Mar. 17, 2014, at URL> https://support.google.com/drive/answer/160749?hl=en, Total 2 pages.

Office Action, dated Feb. 11, 2016, for U.S. Appl. No. 14/643,526, filed Mar. 10, 2015, invented by Trudy L. Hewitt et al., Total 15 pages.

Response to Office Action, dated May 11, 2016, for U.S. Appl. No. 14/643,526, filed Mar. 10, 2015, invented by Trudy L. Hewitt et al., Total 11 pages.

Notice of Allowance, dated Jul. 1, 2016, for U.S. Appl. No. 14/643,526, filed Mar. 10, 2015, invented by Trudy L. Hewitt et al., Total 9 pages.

\* cited by examiner

DYNAMIC MATHEMATICAL VALIDATION USING DATA MINING

FIELD

Embodiments of the invention relate to dynamic mathematical validation using data mining.

BACKGROUND

A person may send the following statement in an email "our #s went from 100 to 120, which was an increase of 26%". However, going from 100 to 120 is not an increase of 26%. Thus, this simple mathematical statement is incorrect. A spell checker does not check for such a mathematical mistake.

SUMMARY

Provided is a method for dynamic mathematical validation using data mining. The method comprises: as text is being received, identifying a mathematical statement in the text based on context of the text; identifying a mathematical solution to the mathematical statement in the text based on the context of the text; determining that the mathematical solution is incorrect using data mining; and, in response to determining that auto-correction is to be performed, correcting the mathematical solution.

Provided is a computer program product for dynamic mathematical validation using data mining. The computer program product comprises a computer readable storage medium having program code embodied therewith, the program code executable by at least one processor to perform: as text is being received, identifying a mathematical statement in the text based on context of the text; identifying a mathematical solution to the mathematical statement in the text based on the context of the text; determining that the mathematical solution is incorrect using data mining; and, in response to determining that auto-correction is to be performed, correcting the mathematical solution.

Provided is a computer system for dynamic mathematical validation using data mining. The computer system, comprising: one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations, wherein the operations comprise: as text is being received, identifying a mathematical statement in the text based on context of the text; identifying a mathematical solution to the mathematical statement in the text based on the context of the text; determining that the mathematical solution is incorrect using data mining; and, in response to determining that auto-correction is to be performed, correcting the mathematical solution.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
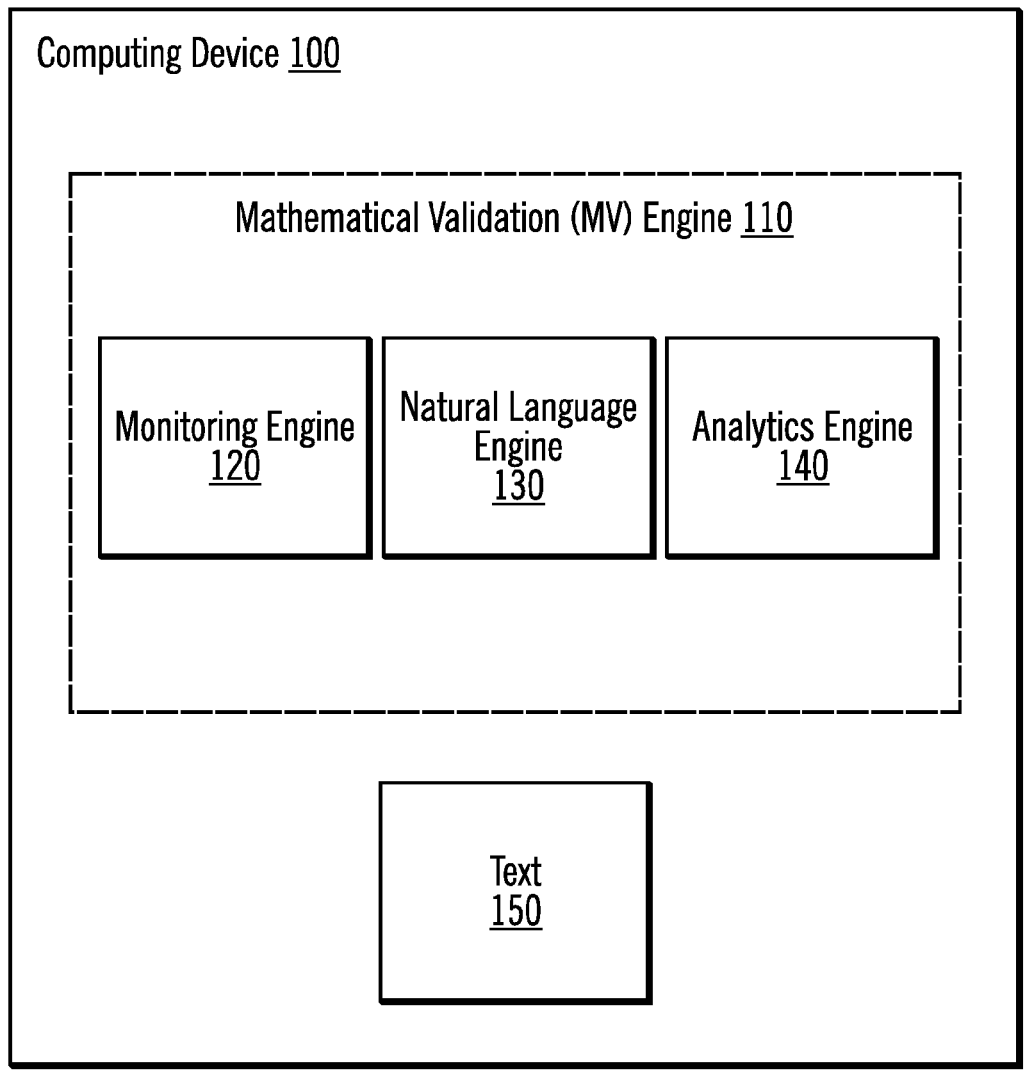
FIG. 1 illustrates, in a block diagram, a computing environment in accordance with certain embodiments.

FIG. 1 illustrates, in a block diagram, a computing environment in accordance with certain embodiments. The computing environment includes a computing device 100. The computing device 100 includes a Mathematical Validation (MV) engine 110 and text 150. The text 150 may be included in any form of communication (e.g., e-mail, text document, spreadsheet, text message, instant message, web form, web forum, broadcast message, table, blog, social post, graphic, chart, other visual, etc.).

In certain embodiments, the MV engine 110 includes a monitoring engine 120, a natural language engine 130, and an analytics engine 140 or the functionality of these engines 120, 130, 140. In other embodiments, the monitoring engine 120, the natural language engine 130, and the analytics engine 140 are separate engines that work together.

The MV engine 110 dynamically validates mathematical statements in context. The mathematical statements may include mathematical equations (e.g., 2+3=5) or may describe mathematical word problems (e.g., "If I drive 55 miles per hour (mph) for 2 hours, I will travel 110 miles."). The context may be concurrent (within the text itself) or non-concurrent (in other communications that are separate from the text). The MV engine 110 may flag mathematical errors dynamically or may automatically provide contextual mathematical corrections. The MV engine 110 determines mathematical solutions automatically for mathematical word problems.

The MV engine 110 passively identifies mathematical statements and mathematical solutions that are found within text. In addition, the MV engine 110 automatically and passively validates mathematical statements to ensure mathematical accuracy. In particular, the MV engine 110 uses an analytics engine to either validate that a mathematical solution is correct and or determines that the mathematical solution is incorrect (for flagging to bring this to the attention of a user or for automatic correction). The term "passive" is used to indicate that the mathematical validation is performed automatically by the MV engine 110, without a specific user request to perform the validation. In certain embodiments, a user may update a setting for passive mathematical checking. In certain alternative embodiments, the user may update the setting to "turn off" the passive mathematical checking and perform a manual check (e.g., by the user selecting a mathematical statement and requesting a mathematical check). In various embodiments, there may be different options for reviewing/correcting mathematical statements based on user preferences or administrator preferences. For example, the user may have a mathematical statement automatically corrected or may set an option so that the user is provided with information about the mathematical errors and solutions (without the automatic correction).

For example, communications may include facts and mathematical statements. The following are some examples of mathematical statements:

"The temperature is so crazy. It dropped 20 degrees since yesterday. It was a high of 75, and now it's only 45 degrees!"

"This is great. Our #s went from 100 to 120, which was an increase of 26%!"

"Add ¼ cup of butter to ¼ cup of water to equal ⅔rds of a cup total."

"I looked at online maps for our trip to Washington D.C. this weekend and saw its 200 miles with an average speed of 55 MPH. If we leave at 5 am and don't make any stops we should be there by 7 am."

Figure 2:
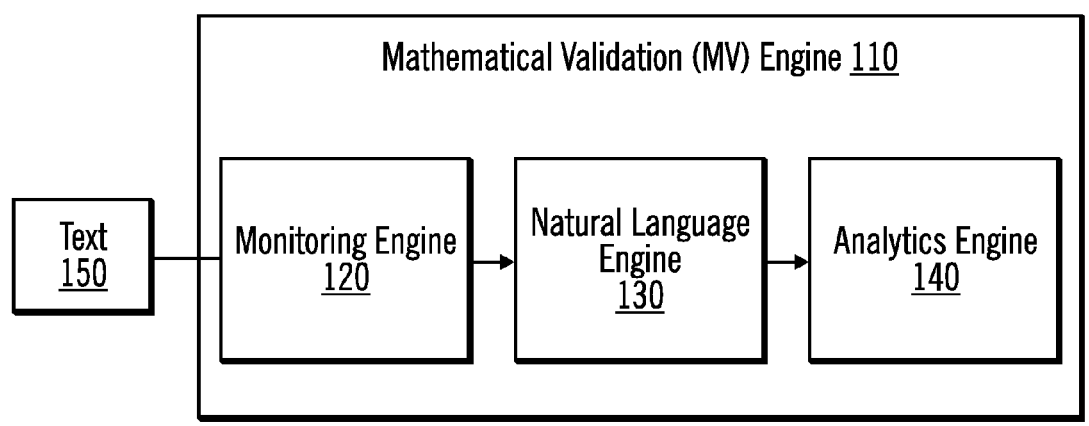
FIG. 2 illustrates, in a block diagram, interaction of a monitoring engine, a natural language engine, and an analytics engine in accordance with certain embodiments.

FIG. 2 illustrates, in a block diagram, interaction of the monitoring engine 120, the natural language engine 130, and the analytics engine 140 in accordance with certain embodiments. The monitoring engine 120 looks for predefined characteristics in the text 150 that would indicate a mathematical statement. Examples of predefined characteristics include both text and numerical numbers, which may be located in text, tables, graphics, charts, and other visuals. Additional examples of predefined characteristics include mathematical terms indicating a mathematical solution (e.g., plus sign ("+"), equal sign ("="), etc.). Further examples of predefined characteristics include locating a change from previous numbers (e.g., increase, decrease, lowered, raised, dropped, times, divided, percentage, total, sum, equals, etc.). In certain embodiments, context may be described as a number of words surrounding pre-defined characteristics.

For example, the monitoring engine 120 may look for the presence of two or more numbers (both text and numerical numbers). The monitoring engine 120 passes on its results to the natural language engine 130.

The natural language engine 130 initiates and evaluates the complete text to determine what key mathematical terms indicate a mathematical solution based on the predefined characteristics. For example, if the monitoring engine 120 found numbers, the natural language engine 130 determines a mathematical relationship between those previous numbers (e.g., increase, decrease, lowered, raised, dropped, times, divided, percentage, total, sum, equals, etc.). The natural language engine 130 passes on its results to the analytics engine 140.

The analytics engine 140 uses data mining to ascertain a full mathematical statement and mathematical solution in context. In certain embodiments, the data mining is used to ascertain a mathematical equation in context, even for non-concurrent text or numbers. For example, if there is a table with the weather temperatures for last month listed, and the text of a document says its 26% hotter this week than last, the data mining would first seek out the dates that would align with that statement, and then look at the table to determine the match for dates and then validate the mathematical problem. Once the full mathematical statement and mathematical solution are identified, the analytics engine 140 also validates whether the mathematical solution already in the text 150 is mathematically correct.

The MV engine 110 allows a user to define a preference as to what subsequent action would occur: either 1) automatic correction or 2) flagging an incorrect mathematical solution.

For automatic correction, the MV engine 110 automatically corrects any mathematical inaccuracies in the text 150. The MV engine 110 may also provide an indication (e.g., via a User Interface (UI)) as to where corrections have been made so the user is aware (and may make further changes as desired).

For flagging, the MV engine 110 updates the text 150 (e.g., displayed in the UI) to indicate the incorrect mathematical solution. In various embodiments, the MV engine 110 may color code the incorrect mathematical solution to reflect its accuracy (e.g., green text=correct, while red text=incorrect), make the text larger, highlight the incorrect mathematical solution, provide a comment about the incorrect mathematical solution, underline the incorrect mathematical solution, etc. With embodiments, a user may select (e.g., via a right click of a mouse when a computer screen displays the text 150, via touching a touch screen displaying the text 150, etc.) the incorrect mathematical solution to see a corrected solution and may select the corrected solution to replace the existing incorrect mathematical solution.

In addition to looking at surrounding text, the analytics engine 140 may also look at tables, graphics, charts, and other visuals to determine whether the mathematical statements are correct. For example, a sentence may be listed in the text advising "the chart below indicates an increase of 50% YTY." The MV engine 110 identifies this text as indicating a mathematical statement, finds the mathematical statement in the chart, finds the mathematical solution in the chart, and makes a comparison to the mathematical solution being proposed against data contained in a table to verify that the mathematical solution is correct.

The MV engine 110 improves the accuracy of mathematical statements in communications to improve the understanding of the receivers. This increases productivity in enabling users to not have to manually check their mathematical statements in a different system, but instead have the mathematical solution check integrated into any communication technique that users are using already.

Figure 3:
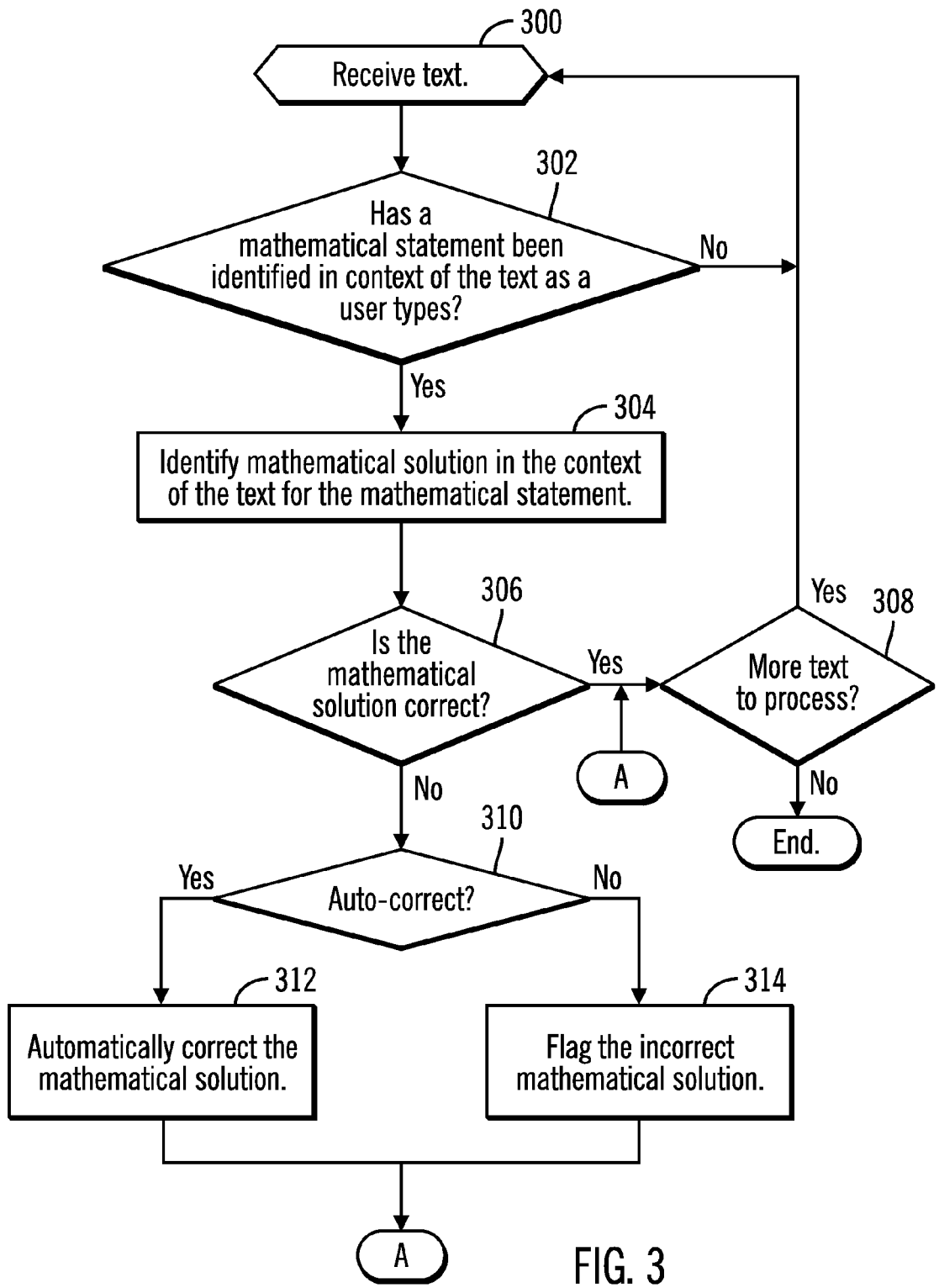
FIG. 3 illustrates, in a flow diagram, operations for validating a mathematical solution in accordance with certain embodiments.

FIG. 3 illustrates, in a flow diagram, operations for validating a mathematical solution in accordance with certain embodiments. Control begins at block 300 with the MV engine 110 receiving text. In block 302, the MV engine 110 determines whether a mathematical statement has been identified in the context of the text as a user types. If so, processing continues to block 304, otherwise, processing continues to block 300.

In certain other embodiments, the user completes typing the text 150 and inputs the text 150 to the MV engine 110 for processing (e.g., by selecting a "mathematical validation" tool or button). In various embodiments, that text 150 may be provided via voice to text or other way of documenting text in which a mathematical equation may be present.

In block 304, the MV engine 110 identifies a mathematical solution in the context of the text for the mathematical statement. In block 306, the MV engine 110 determines whether the mathematical solution is correct. If so, processing continues to block 308, otherwise, processing continues to block 310. The mathematical solution may be validated using concurrent context (within the text itself) or non-concurrent context (in other communications that are separate from the text). That is, determining that the mathematical solution is incorrect may be based on information obtained from communications that are separate from the text.

In block 308, the MV engine 110 determines whether there is more text 150 to process. If so, processing continues to block 300, otherwise, processing ends.

In block 310, the MV engine 110 determines whether automatic correction has been selected. If so, processing continues to block 312, otherwise, processing continues to block 314.

In block 312, the MV engine 110 automatically corrects the mathematical solution and processing continues block 310. In block 314, the MV engine 110 flags the incorrect mathematical solution and processing continues to block 310. In certain embodiments, in response to user selection of the flagged mathematical statement, the MV engine 110 provides a corrected mathematical statement, and, in response to user selection of the corrected mathematical statement, the MV engine 110 updates the text 150 with the corrected mathematical statement.

In certain embodiments, the MV engine 110 allows for approximated calculation. Approximated calculation may be used to describe an approximate solution. An example of an approximated calculation is: "There are 3 votes out of 8 disagreed with the new proposal, which is about a third." Mathematically, $3/8$ is not $1/3$, but it is approximately $1/3$. In certain embodiments, the MV engine 110 allows a user to predefine a level of precision/accuracy for the mathematical statements (e.g., in rules or preferences). Also, in other embodiments, the MV engine 110 provides a feature for approximated calculation that may be customized at the user and/or level. For example, a user may expand and/or narrow how closely the user wants the accuracy to be for a mathematical statement. The MV engine 110 may also allow for users to create new criteria and rules for identifying and validating mathematical statements and mathematical solutions. Using the example approximated calculation above, he first time this occurs, $1/3$rd may be flagged for review, but then if a user accepts that as "close enough" then the preferences are updated by the MV engine 110 and used for future equations.

Cloud Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 4:
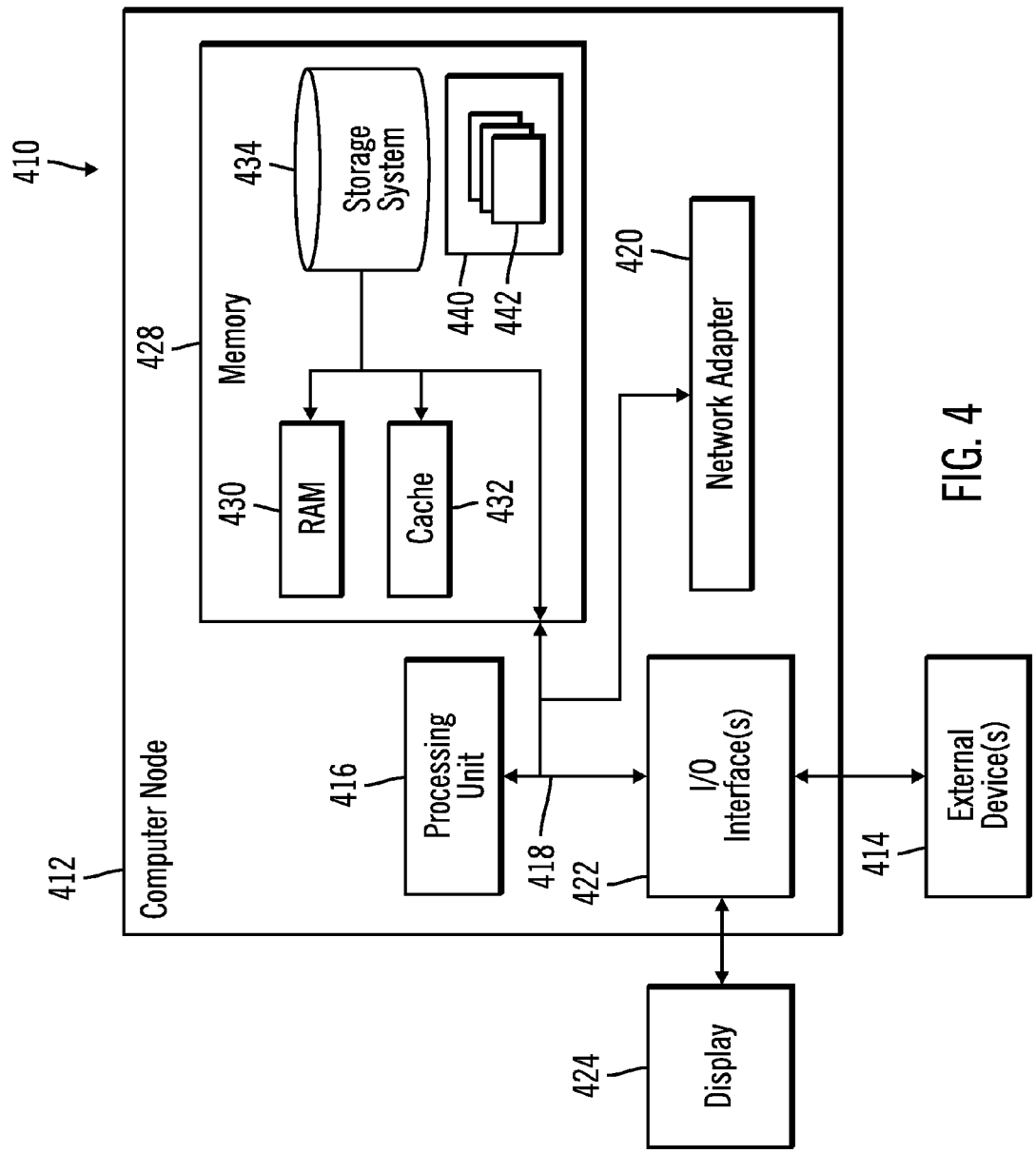
FIG. 4 illustrates a cloud computing node in accordance with certain embodiments.

Referring now to FIG. 4, a schematic of an example of a cloud computing node is shown. Cloud computing node 410 is only one example of a suitable cloud computing node and is not intended to suggest any limitation as to the scope of use or functionality of embodiments of the invention described herein. Regardless, cloud computing node 410 is capable of being implemented and/or performing any of the functionality set forth hereinabove.

In cloud computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in cloud computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Figure 5:
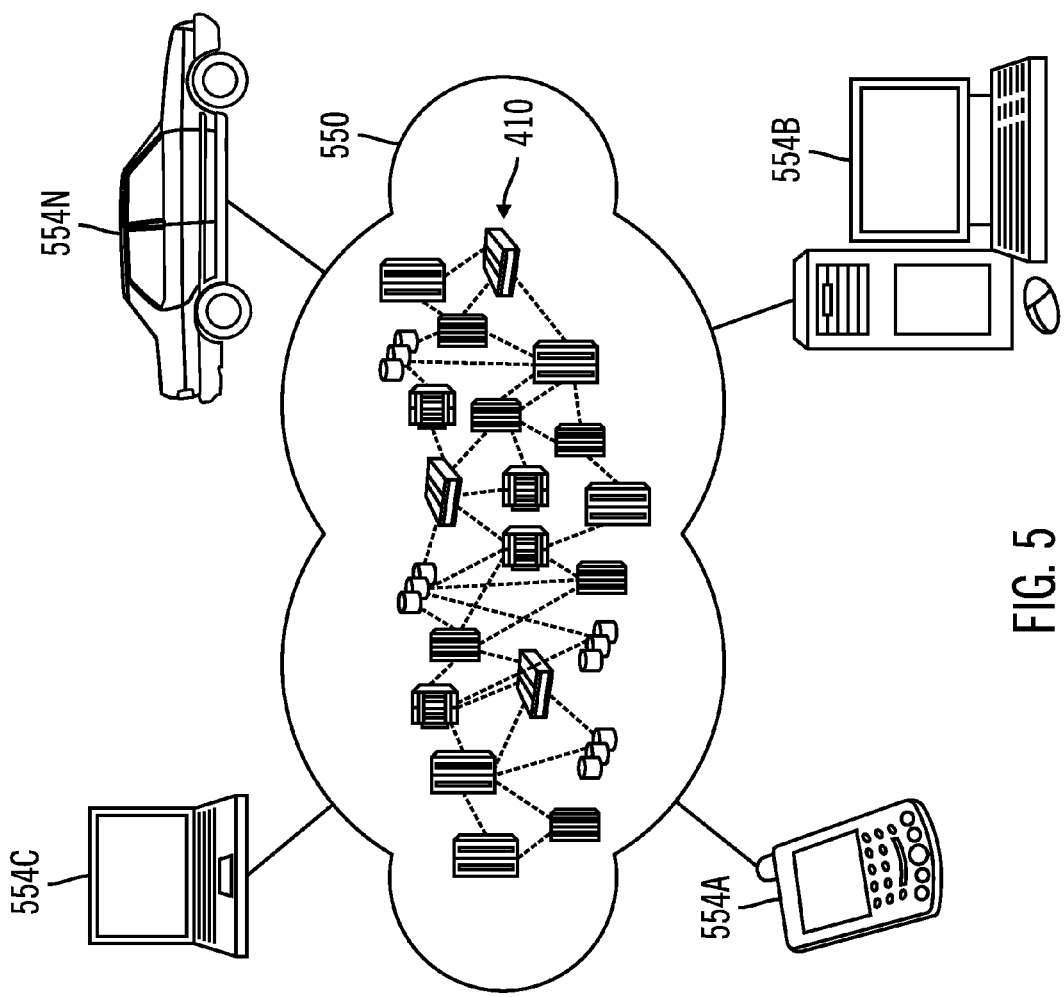
FIG. 5 illustrates a cloud computing environment in accordance with certain embodiments.

Referring now to FIG. 5, illustrative cloud computing environment 550 is depicted. As shown, cloud computing environment 550 comprises one or more cloud computing nodes 410 with which local computing devices used by cloud consumers, such as, for example, personal digital assistant (PDA) or cellular telephone 554A, desktop computer 554B, laptop computer 554C, and/or automobile computer system 554N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 410 and cloud computing environment 550 can communicate with any type of computerized device over any type of network and/or network addressable connection (e.g., using a web browser).

Figure 6:
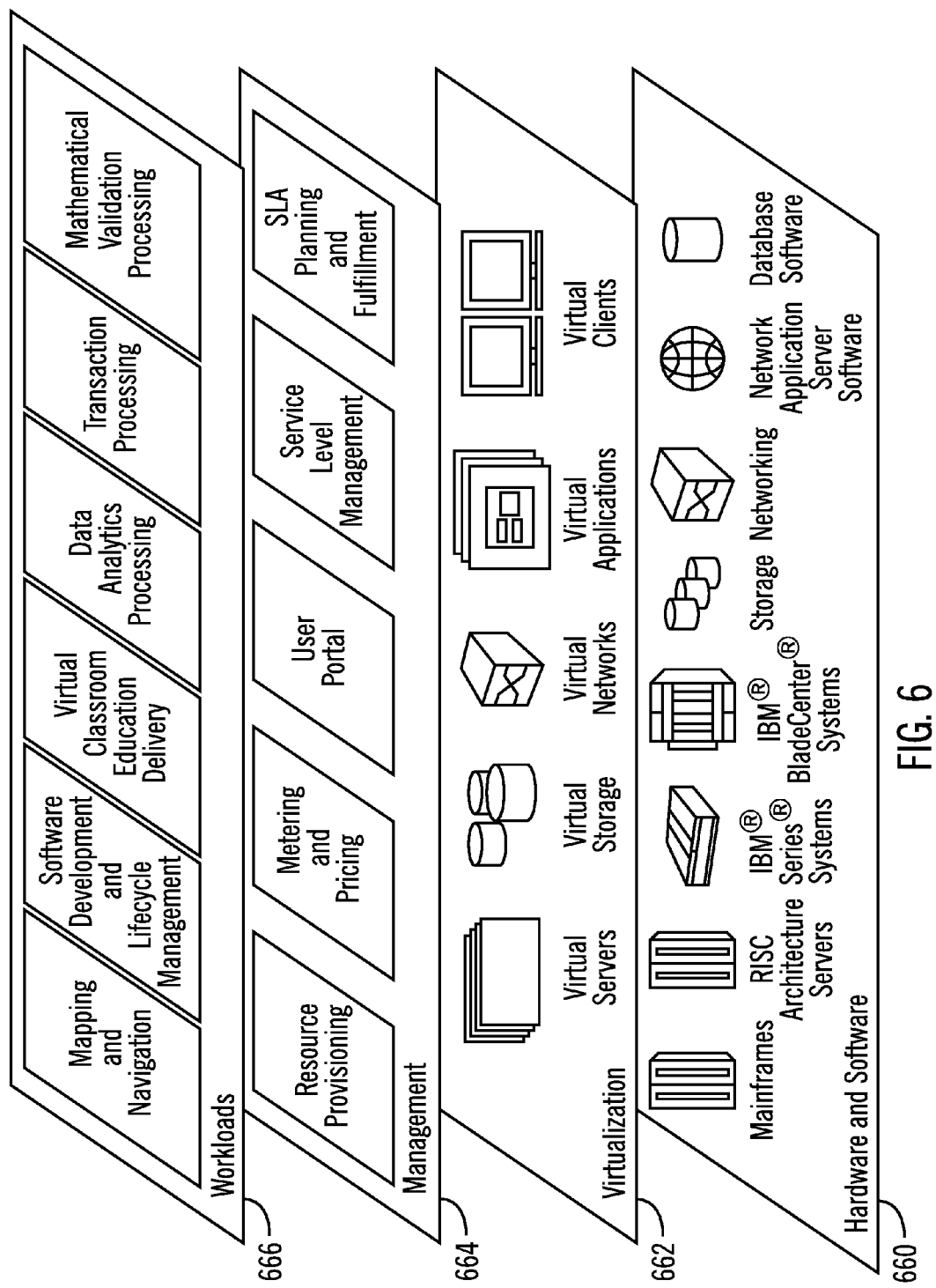
FIG. 6 illustrates abstraction model layers in accordance with certain embodiments.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 662 provides an abstraction layer from which the following examples of virtual entities may be provided: virtual servers; virtual storage; virtual networks, including virtual private networks; virtual applications and operating systems; and virtual clients.

In one example, management layer 664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 666 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mathematical validation processing.

Thus, in certain embodiments, software or a program, implementing mathematical validation processing in accordance with embodiments described herein, is provided as a service in a cloud environment.

In certain embodiments, the computing device 100 has the architecture of computing node 410. In certain embodiments, the computing device 100 is part of a cloud environment. In certain alternative embodiments, the computing device 100 is not part of a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

We claim:

1. A computer program product, the computer program product comprising a computer readable storage medium having program code embodied therewith, the program code executable by at least one processor to perform:
   as text is being received,
      identifying a mathematical statement in the text based on context of the text using a monitoring engine to identify predefined characteristics including numbers and a relationship between the numbers;
      identifying a mathematical solution to the mathematical statement in the text based on the context of the text and the predefined characteristics using a natural language engine;
      determining that the mathematical solution is incorrect using an analytics engine and data mining;
      determining whether auto-correction is to be performed; and
      in response to determining that auto-correction is to be performed, correcting the mathematical solution.

2. The computer program product of claim 1, wherein the program code is executable by the at least one processor to perform:
   determining whether flagging is to be performed;
   in response to determining that flagging is to be performed, flagging the mathematical solution as incorrect;
   in response to user selection of the flagged mathematical statement, providing a corrected mathematical statement; and
   in response to user selection of the corrected mathematical statement, updating the text with the corrected mathematical statement.

3. The computer program product of claim 1, wherein the program code is executable by the at least one processor to perform:
   identifying the relationship based on one of a mathematical term and a change between the numbers.

4. The computer program product of claim 3, wherein the program code is executable by the at least one processor to perform:
   evaluating the text to determine which mathematical terms indicate the mathematical solution based on the one or more predefined characteristics.

5. The computer program product of claim 1, wherein determining that the mathematical solution is incorrect is based on information obtained from communications that are separate from the text.

6. The computer program product of claim 1, wherein a Software as a Service (SaaS) is configured to perform the computer program product operations.

7. A computer system, comprising:
   one or more processors, one or more computer-readable memories and one or more computer-readable, tangible storage devices; and
   program instructions, stored on at least one of the one or more computer-readable, tangible storage devices for execution by at least one of the one or more processors via at least one of the one or more memories, to perform operations, wherein the operations comprise:
   as text is being received,
      identifying a mathematical statement in the text based on context of the text using a monitoring engine to identify predefined characteristics including numbers and a relationship between the numbers;
      identifying a mathematical solution to the mathematical statement in the text based on the context of the text and the predefined characteristics using a natural language engine;
      determining that the mathematical solution is incorrect using an analytics engine and data mining;
      determining whether auto-correction is to be performed; and and
      in response to determining that auto-correction is to be performed, correcting the mathematical solution.

8. The computer system of claim 7, wherein the operations further comprise:
   determining whether flagging is to be performed;
   in response to determining that flagging is to be performed, flagging the mathematical solution as incorrect;
   in response to user selection of the flagged mathematical statement, providing a corrected mathematical statement; and
   in response to user selection of the corrected mathematical statement, updating the text with the corrected mathematical statement.

9. The computer system of claim 7, wherein the operations for identifying the mathematical statement further comprise:
   identifying the relationship based on one of a mathematical term and a change between the numbers.

10. The computer system of claim 9, wherein the operations for identifying the mathematical solution further comprise:
    evaluating the text to determine which mathematical terms indicate the mathematical solution based on the one or more predefined characteristics.

11. The computer system of claim 7, wherein determining that the mathematical solution is incorrect is based on information obtained from communications that are separate from the text.

12. The computer system of claim 7, wherein a Software as a Service (SaaS) is configured to perform the system operations.

13. The computer program product of claim 1, wherein the program code is executable by the at least one processor to perform:
    determining that the mathematical solution is correct based on an approximated calculation.

14. The computer system of claim 7, wherein the operations further comprise:
    determining that the mathematical solution is correct based on an approximated calculation.

* * * * *